United States Patent [19]

Lowe

[11] 4,325,928
[45] Apr. 20, 1982

[54] ROCK TREATMENT PROCESS

[75] Inventor: Edward J. Lowe, Stourbridge, England

[73] Assignee: Albright & Wilson Limited, Warley, England

[21] Appl. No.: 123,687

[22] Filed: Feb. 22, 1980

[30] Foreign Application Priority Data

Mar. 1, 1979 [GB] United Kingdom ............... 07334/79

[51] Int. Cl.$^3$ ............................................. C01B 25/16
[52] U.S. Cl. .................................. 423/320; 423/319; 423/321 R
[58] Field of Search ................... 423/319, 320, 321 R, 423/166, 167

[56] References Cited

U.S. PATENT DOCUMENTS

| | | | |
|---|---|---|---|
| 2,531,977 | 11/1950 | Hammaren et al. | 423/320 |
| 2,783,140 | 2/1957 | Hignett et al. | 423/320 |
| 2,799,557 | 7/1957 | Seyfried | 23/109 |
| 2,841,467 | 7/1958 | McCullough | 23/14.5 |
| 2,894,809 | 7/1959 | McCullough | 23/14.5 |
| 3,122,415 | 2/1964 | Gilchrist | 23/165 |
| 3,133,791 | 5/1964 | Laib et al. | 423/320 |
| 3,723,597 | 3/1973 | Danbrine et al. | 423/200 |
| 3,932,591 | 1/1976 | Ribas et al. | 423/320 |
| 3,995,987 | 12/1976 | MacAskill | 432/15 |
| 4,001,383 | 1/1977 | Petersen | 423/531 |
| 4,016,238 | 4/1977 | Urbina | 423/119 |
| 4,017,585 | 4/1977 | Angevine | 423/167 |
| 4,215,098 | 7/1980 | Lowe et al. | 423/305 |

FOREIGN PATENT DOCUMENTS

| | | |
|---|---|---|
| 368737 | 5/1922 | Fed. Rep. of Germany . |
| 1235869 | 3/1967 | Fed. Rep. of Germany . |
| 2103065 | 10/1971 | Fed. Rep. of Germany . |
| 319303 | 11/1902 | France . |
| 2142790 | 1/1970 | France . |
| 181255 | 6/1922 | United Kingdom . |
| 779008 | 7/1957 | United Kingdom . |
| 953598 | 3/1964 | United Kingdom . |
| 1001172 | 8/1965 | United Kingdom . |
| 1094918 | 12/1967 | United Kingdom . |
| 1128104 | 9/1968 | United Kingdom . |
| 1320464 | 6/1973 | United Kingdom . |
| 1331052 | 9/1973 | United Kingdom . |
| 1557248 | 9/1976 | United Kingdom . |

OTHER PUBLICATIONS

Guffey, "Chem. Eng. Prog." 58, No. 10, pp. 91–93.
Haws, "Minerals Processing", Oct. 1969, pp. 13–17 and 24.
Kirk Othmer, "Encyclopedia of Chemical Technology", 1966, Second Edition, vol. 9, p. 85.
Freeman et al., "J. Ag. Food. Chem.", 12, No. 6, Nov.–Dec. 1964, pp. 479–486.
"Phosphorus and Potassium", No. 41, May/Jun. 1969, pp. 13–16.
"Phosphorus and Potassium", Nov./Dec. 1978, No. 98, p. 14.
"World Survey of Phosphate Deposits", British Sulphur Corp., London, 1973, pp. 45, 46 and 106.
Gemlin's Handbuch der anorganischem Chemie, Verlag Chemie, 1934, p. 1169.
EN. Isakov, Zuhr. Prikl. Khim., 1939, 12, pp. 388–397 (Chem. Abs. 1939 7053).
Hill Marshall & Jacob., J. of Association of Official Agricultural Chemists, vol. XVI, 1933, pp. 260–276.
IA Leont'eva et al., "Issledovaiya V Oblasti Khimii i Teknologii Mineral'nykk Solei i Okislov," Moscow, 1965, pp. 3–5.
Dankiewicz et al., "Przemysl Chemiczny", 1977, vol. 56, No. 8, pp. 429–431, (Chem. Abs. 88 52578f).
M. K. Orphy et al., "Mining Magazine", Sep. 1969, vol. 121, No. 3, pp. 195, 197, 199 and 201.
Hill et al., "J. Assoc. of Official Agric. Chemists", vol. XVI, 1933, pp. 260–276.
Freeman et al., "Food Chem.", vol. 21, No. 6, Nov.–Dec. 1964, pp. 479–486.
Alter et al., "Proc. UN Int. Conf. Peaceful Uses of At. Energy, 2nd Conference", vol. 1, 1958, pp. 253–259.
J. R. Lehr, "Proceedings of Round Table of Fertilizer Society", 1967, pp. 61–67.
Memminger et al., "Ind. Eng. Chem.", 1929, 22.
J. R. Lehr et al., "Cento Symposium on Mining and Beneficiating Fertilizer Minerals", Istanbul 1973, Central Treaty Organization, Ankara, 1974, pp. 194–242.
Waggaman, "Phosphoric Acid, Phosphates and Phosphatic Fertilizers", Reinhold, New York, 1952, Second Ed., pp. 190–191, 230, 233, 277.
Van Wazer, "Phosphorus and its Compounds", 1961, vol. II, pp. 1037 and 1038.
Slack, "Phosphoric Acid", 1968, vol. 1, Part II, pp. 742 and 743.
Hartley, "Australian Chemical Processing and Engineering", Apr. 1970, pp. 19–27.

*Primary Examiner*—O. R. Vertiz
*Assistant Examiner*—Gregory A. Heller
*Attorney, Agent, or Firm*—Frishauf, Holtz, Goodman & Woodward

[57] ABSTRACT

Phosphate rock can be heat treated at 380°–600° C. to convert the organics to filterable carbon and the rock converted to wet process phosphoric acid of reduced color and with reduced foaming. Rocks having high acid soluble organics but low total organics, and rocks containing a high content of acid insoluble heat labile iron sulphide are especially suitable.

26 Claims, No Drawings

ROCK TREATMENT PROCESS

This invention relates to a thermal treatment process, in particular a thermal treatment of phosphate rock.

Calcium phosphate rock contains many impurities, among which are organic compounds e.g. humic acid. The organic impurities can cause severe foaming when the rock is treated with acid to form calcium sulphate and wet process phosphoric acid and also gives rise to coloured downstream products, e.g. phosphoric acid and alkali phosphate salts. It is known to remove the organics by active carbon treatment or use of oxidizing salts on the phosphoric acid or salts therefrom or by calcination of the rock. In the calcination, the rock is usually burnt to convert the organics to carbon dioxide to leave a calcined rock substantially free of organic carbon, and suitable for conversion to down stream products; temperatures of 750° C. or above are useful for this calcination. The foaming characteristics can be removed by prolonged heating at temperatures above 650° C. without necessarily complete oxidation of the organic compounds (see Chem. Eng. Progress Vol. 58, 1962 pages 91–93).

We have found that by thermal treatment of the rock at lower temperatures than described above, the organic compounds can be at least partly, and usually substantially converted to insoluble particulate carbon, which can be filtered with the calcium sulphate in the subsequent acidification to form wet process phoshoric acid.

The present invention provides a process for preparing phosphoric acid from phosphate rock wherein phosphate rock is heated to give a heated rock and the heated rock is reacted with acid to form a calcium salt and phosphoric acid, wherein phosphate rock comprising organic compounds is heated at 380°–600° C. to convert at least some of the organic compounds to carbon to produce a heated rock comprising carbon particles, and said heated rock comprising carbon particles is reacted with a mixture of sulphuric acid and phosphoric acid to form a solid fraction comprising calcium sulphate and carbon particles and wet process phosphoric acid, and the acid is separated from said solid fraction. The phosphate rock is heated at a temperature sufficient to convert at least some of the said impurities and preferably substantially all of them, to particulate carbon but insufficient to cause burning of all the carbon to an oxide of carbon so that the treated rock contains carbon particles. When the treated rock is reacted with the acid there is formed a mixture comprising phosphoric acid, sulphuric acid, calcium sulphate usually as gypsum, carbon particles and usually a little unattacked rock; the mixture may be filtered to leave a wet process acid free of carbon particles, and of significantly reduced color e.g. yellow rather than the deep brown of acid from some untreated rocks.

The heating of the phosphate rock by the present process may enable the reaction with the acid to proceed more satisfactory, with less or no foaming than if untreated rock is attacked so that the acidification is advantageously carried out in the substantial absence of any anti-foaming agent. The reaction with rock may also be carried out with a faster filtration rate and rate of attack of the rock than if rock calcined at 950° C. is attacked. Furthermore the heating in the present process reduces or eliminates the need for use of active carbon or oxidizing agents on the acid or salts therefrom to reduce their colour. The lower temperature heating also represents a significant economic advantage.

The rock is heated at a temperature of at most 600° C. i.e. 380°–600° C., such as 450°–600° C. and especially 450°–550° C.; temperatures of 380°–500° C. e.g. 380°–480° C. and especially 420°–480° C. may be used but the rate of conversion of the organics to carbon is slower than at higher temperatures. The rock is usually heated at the given temperature for 0.01–10 e.g. 0.1–10 hours e.g. 0.5–2 hr. for batch processes or 1 min–1 hour e.g. 2–30 minutes for continuous processes inversely depending on the temperature.

While conventional calcination at 650° C. or above gives a significant amount of hydrogen fluoride in any gaseous effluent from the heating, the heating at the lower temperature of this invention gives much less fluoride, often substantially no fluoride in the effluent, rendering easier the purification of that effluent.

The heating treatment may be carried out under essentially anaerobic conditions with essentially no free oxygen (or other agent capable of oxidizing the organic impurities); thus the rock may be externally heated in the absence of air e.g. in an oven with exclusion of air. However, advantageously the rock is heated in the absence of oxidants (apart from oxygen) capable of oxidizing the organic impurities; thus the rock may be heated in the presence of air such as in an oven or heated e.g. by an oxidizing flame in a kiln to the requisite temperature. The heating may be carried out with a deficiency of oxygen relative to the amount needed to convert the organic impurities to carbon, but preferably at least the required amount and especially an excess is used. The heat treatment is preferably continuous with the rock e.g. in the form of a continuous layer passing continuously under a flame, or in a rotating drum in counter current flow to the hot combustion products of a flame or in a fluidized bed. While the heat treatment may be carried out on a large particulate rock, the rock is preferably at less than 5 mm size, and preferably is ground first e.g. to a size of 0.01–1 mm e.g. with at least 50% of 0.01–0.5 mm and preferably with less than 30% of less than 0.1 mm.

The rock may contain 0.05–6% e.g. 0.05–1.0% or 0.5–6.0% organic material (expressed by weight as organic carbon) as well as conventional rock impurities. The rock may thus contain (by weight) 15–45% $P_2O_5$ e.g. 25–40% $P_2O_5$, 25–35% or 30–40% or especially 30–35% $P_2O_5$, 25–55% e.g. 45–55 or 50–55% CaO, 0.01–8% e.g. 0.05–0.5% or 0.5–5% $Fe_2O_3$ with a total iron and aluminum content of e.g. less than 10% e.g. less than 4% by weight (expressed as $Fe_2O_3$ and $Al_2O_3$) and 1.0–7% e.g. 1–3.5% or 3.5–7% carbonate (expressed as $CO_2$). The invention is particularly suitable for treating apatite phosphate rocks, e.g. those which on digestion with 27% hydrochloric acid form brown liquids; examples of such rocks are those from Zin in Israel, and Florida. However other rocks e.g. those from the U.S. Western States or elsewhere such as Tennessee, Tunisia, Jordan and Morocco may also be treated. The phosphate rock preferably contains 0.05–0.4% organics, or a weight ratio of organics to $P_2O_5$ of 0.001–0.1:1, rocks with a low organic content such as those from Zin (Israel), Khouribga (Morocco), El Massa (Jordan), Algeria, Tunisia, Senegal.

The process is particularly suitable for treating rocks which contain acid soluble organics (as hereinafter defined). The term "acid soluble organics" as used in this specification means organic compounds found in phosphate rock, which are of such a nature and in such an amount, that on digestion of the rocks with a mixture of 56% sulphuric acid and 20% thermal phosphoric acid, (said mixture containing enough sulphuric acid to convert the calcium oxide content of the rock into calcium sulphate), to form a suspension in a liquid containing 25–30% $P_2O_5$, contains at least 600 ppm (e.g. 600–60,000 ppm) dissolved organics (expressed as total carbon) i.e. a weight ratio of dissolved organics (expressed as total carbon) to $P_2O_5$ in the liquid of at least 0.002:1 g 0.002–0.2:1; alternatively the liquid content of dissolved organics expressed as oxidizable carbon is at least 100 ppm e.g. 100–10,000 ppm i.e. a weight ratio of organics to $P_2O_5$ of 0.0003:1 e.g. 0.0003–0.03:1. It is these rocks which give acids containing the higher amounts of dissolved organics which can be most usefully improved by the heat treatment of the invention in order to give treated rocks from which acid containing smaller amounts of organics (e.g. 500 ppm or less total carbon or 50 ppm or less oxidizable carbon) can be made.

Among rocks which may be treated by the process of this invention are those where the rocks themselves have a low organics content e.g. 0.05–0.4% (total carbon), but these organics are acid soluble as hereinbefore defined. Such rocks are obtained for example from Zin in Israel, Algeria, Tunisia, Jordan and Senegal. Thus in another aspect the present invention provides a process for heat treating phosphate rock, wherein a phosphate rock comprising a total of 0.05–0.4% organic compounds (expressed as carbon) and acid soluble organics is heat treated at 380°–600° C. to convert at least some organic compounds to carbon to form a heated rock comprising carbon particles. Preferably the rock comprises 30–40% $P_2O_5$ and 45–55% CaO.

Furthermore we have found with phosphate rocks heat treatment of the rock at 650° C. gives a treated rock that on acidification with a mineral acid gives hydrogen sulphide in different amounts depending on the rock, and that when the rock is heat treated by the process of this invention at a lower temperature e.g. 380°–600° C., the amount of the offensive and poisonous hydrogen sulphide produces on acidification may be reduced as may be iron content of the product acid. We believe this high temperature effect is due to conversion at the higher temperature of acid insoluble iron sulphide present in the rock into acid soluble iron sulphide, which on acidification form hydrogen sulphide and dissolved iron.

Hence in a particular embodiment of the present invention, there is provided a process for preparing phosphoric acid wherein phosphate rock containing organic impurities and acid insoluble heat labile iron sulphide is heated at 380°–600° C. to convert at least some of said organic impurities to carbon particles but insufficient to cause conversion of all of said acid insoluble sulphide into acid soluble iron sulphide, the heating process giving a treated rock containing carbon particles and acid insoluble iron sulphide and the treated rock is reacted with the mixture of sulphuric and phosphoric acids to form a reaction mixture comprising phosphoric acid, sulphuric acid, calcium sulphate, carbon particles and acid insoluble heat labile iron sulphide and separating a solid fraction comprising said carbon particles and acid insoluble iron sulphide and calcium sulphate, usually as gypsum, from a wet process phosphoric acid. The terms acid insoluble and acid soluble iron sulphide mean those iron sulphides which are insoluble or soluble in a wet process phosphoric acid containing 28% $P_2O_5$ and 0.5% $SO_3$. The term "heat labile" iron sulphide in this specification means the iron sulphide in the rock which can be changed from acid insoluble to acid soluble on heating. The heat treatment is carried out at 380° C. to 600° C. e.g. 380°–480° C. especially 400°–450° C. or 450°–550° C. and usually at a temperature below the phase transition temperature in that rock for the conversion of acid insoluble to acid soluble iron sulphide. The heating conditions are generally otherwise as described above.

The process involving avoidance of the production of hydrogen sulphide may be applied to any phosphate rock such as those described above, but particularly those which contain heat labile acid insoluble iron sulphide, e.g. in an amount of at least 100 ppm (preferably at least 500 ppm) sulphide (expressed by weight as S) such as 100–20,000 e.g. 500–10,000 such as 2000–5000 ppm or at least 200 ppm metal sulphide (expressed by weight as $FeS_2$) such as 200–40,000 such as 1,000–10,000 ppm. The content of heat labile acid insoluble sulphide of the unheated rock is obtained from the maximum level of hydrochloric acid soluble sulphide found in rocks heated to any temperature in the 100°–1000° C. range. Such rocks are for example those from Zin, Youssoufia and especially Florida, for the last of which the preferred heating temperature is 450°–550° C.; rocks from Tennessee, N.C., Idaho and the other U.S. Western States may also be similarly treated.

In another aspect of the present invention provides a heated phosphate rock comprising carbon particles and acid insoluble heat labile iron sulphide at least 70% e.g. at least 80% such as 80–98% or at least 90% of which is acid insoluble and the rest if any is acid soluble. Preferably the rock contains at least 500 ppm e.g. 500–5000 ppm of said acid insoluble heat labile iron sulphide (expressed as S).

In the conversion of the heat treated rock to the wet process acid, whether that rock contains a significant amount of iron sulphides or not, the rock is treated with sulphuric acid and phosphoric acid, to produce said reaction mixture containing a liquid and a solid fraction in which a major amount of the solid fraction comprises calcium sulphate and a minor amount of carbon particles (and if appropriate iron sulphide) and usually a little unattacked rock. The amount of sulphuric acid is usually such as to convert at least 90% e.g. at least 95% of the phosphate values in the rock into wet process phosphoric acid or is equivalent to at least 90% of the Calcium oxide content of the rock preferably 95–105%. The reaction of the treated rock with the mixture of phosphoric and sulphuric acids may be carried out at low temperature and with a low concentration of sulphuric acid to form gypsum or at high temperatures e.g. above 90° C. and with a high concentration of sulphuric acid to form calcium sulphate hemi hydrate or anhydrite. Conveniently the rock is mixed with sulphuric acid and recycle weak phosphoric acid and a recycle suspension of calcium sulphate in wet process phosphoric acid to form the suspension of calcium sulphate a portion of which is recycled and the rest is separated e.g. by filtration and the filter cake of the calcium sulphate (with carbon particles and possibly iron sulphide) is washed with water to give a filtrate of weak phosphoric acid, which is recycled to the stage of attack on the rock.

The invention is illustrated in the following Examples.

EXAMPLES 1-3 AND COMPARATIVE EXAMPLES A-D

Phosphate rock from Zin, Israel, had the following analysis 32.0% $P_2O_5$; 6.0% $CO_2$; 2.0% $SO_3$; 1.5% $SiO_2$; 4.0F; 51% Ca (as Cao); 0.2% Mg 0.3% Al (as $Al_2O_3$); 0.2% Fe (as $Fe_2O_3$); 0.9% Na (as $Na_2O$); 0.2% oxidizable organic material (expressed as C).

It has a particle size distribution of 6.5% greater than 0.5 mm; 27.3% between 0.25 and 0.5 mm; 38.9% between 0.15 and 0.25 mm; 27.3% less than 0.15 mm.

A layer of the above rock, was heated in an oven for 1 hour in the presence of air at a temperature specified below. The treated rock was inspected when cold. The rocks treated at 400°–700° C. were dark and showed the presence of carbon particles.

As an estimation of the effect of the heating to remove the organics from the rock, the rock (heat treated or otherwise) (100 g) was added gradually to a mixture of concentrated hydrochloric acid (35%, 205 g) and water (75 g). The temperature of the mixture rose to 40°–45° C. and the mixture was then heated for 1 hour at the boiling point. The degree of foaming obtained in the reaction of rock and acid was noted. The reaction mixture was filtered hot to remove any carbon particles, unreacted rock and some calcium salts, then cooled to room temperature and refiltered to give a crude phosphoric acid. Th colour of the crude acid was noted and the results were as follows

TABLE 1

| Example | Temp. of heating °C. | Colour of Rock Product | Colour of acid | Degree of foaming |
|---|---|---|---|---|
| A (Comp) | None | Sandy | deep red brown | large |
| B (Comp) | 200 | " | " | large |
| 1 | 400 | Pale black | Strong yellow | |
| 2 | 450 | Medium black | Medium yellow | |
| 3 | 500 | Black | pale green | |
| C (Comp) | 700 | Grey | " | small |
| D (Comp) | 900 | Green | " | small |

EXAMPLES 4-8 AND COMPARATIVE EXAMPLE D

In the same manner as in Ex. 1–3, phosphate rock from Zin, Israel of the same analysis and particle size as before was heated at various temperatures and for various times. The treated rock was reacted with hydrochloric acid as before and in separate experiment with a sulphuric/phosphoric acid mixture and the colour of the liquid noted and organic and $P_2O_5$ content of the liquid obtained. The sulphuric/phosphoric acid was a mixture of 200 g of 20% $P_2O_5$ thermal phosphoric acid and enough 56% sulphuric acid to combine with 98% of the calcium content of the phosphate rock used, the amount of which was such as to contain 40 g $P_2O_5$. The specified amount of rock was mixed with stirring with 200 g of phosphoric acid at 60° C. When foaming ceased the sulphuric acid was added and the mixture stirred for 2 hrs at 70° C. to give a suspension of gypsum in phosphoric acid. The suspension was filtered hot and the filter cake washed three times with 50 cc cold tap water. All the filtrates were combined to give the product acid which was analysed for $P_2O_5$, total carbon and oxidizable carbon contents. The rock before and after the heating was also analysed for F. The results were as follows. (see Table 2). The Zin rock before heat treatment contained acid insoluble iron sulphide in amount of 250 ppm (expressed as S).

EXAMPLES 9-18. COMPARATIVE EXAMPLE E-J

In the same manner as in Ex. 4–8, the same procedures of heating phosphate rock, and reacting the rock with hydrochloric or the sulphuric/phosphoric acid mixtures were carried out with rocks other from Zin. Details of the rocks, and the results obtained are given in the Tables 3-5 below. In each case the heat treatment was for 1 hour, unless stated otherwise. When the unheated Moroccan rock was digested with the $H_2SO_4/H_3PO_4$ mixture, the liquid (after filtration) contained 27.8% $P_2O_5$, 100–200 ppm total carbon and 15–20 ppm oxidizable carbon.

EXAMPLE 17-19

The Zin rock as in Example 4 was continuously heat treated in an inclined rotary calciner in which the rock travelled slowly down the calciner against a stream of air/burnt gas. The residence time was 20-30 minutes. The temperatures of the entry gas, solid at the point of leaving the calciner and effluent gas were measured. The heat treated rock was collected and treated with the sulphuric/phosphoric acid mixture as in Example 4; the insolubles (comprising gypsum and carbon particles) were filtered and the colour of the product acid noted. The results were as follows.

| Example | Temperatures °C. Solids exit | Entry Gas | Effluent Gas | Colour of product acid |
|---|---|---|---|---|
| 17 | 430 | 800 | — | orange yellow |
| 18 | 510 | 880 | 210 | Very pale green |
| 19 | 520 | 890 | 200 | Very pale green |

TABLE 2

| Example | Heat treatment on Rock Temp. °C. | Time (mins) | % F in rock | HCl acidulation Colour of acid produced | Degree of Foaming | $H_2SO_4/H_3PO_4$ acidulation Colour of acid produced |
|---|---|---|---|---|---|---|
| E | Uncalcined | — | 3.8 | Strong red-brown | large | Reddish-brown |
| 4 | 400 | 15 | — | — | | Light reddish-brown |
| 5 | 400 | 60 | 3.8 | Yellow | some | Yellow |
| 6 | 500 | 15 | — | — | | Pale Yellow |
| 7 | " | 30 | 3.9 | Yellow-green | small | — |

TABLE 2-continued

| | Heat treatment on Rock | | % F in rock | HCl acidulation | | H$_2$SO$_4$/H$_3$PO$_4$ acidulation |
|---|---|---|---|---|---|---|
| Example | Temp. °C. | Time (mins) | | Colour of acid produced | Degree of Foaming | Colour of acid produced |
| 8 | " | 60 | 3.8 | Pale green | small | Very pale green |

The filtered liquid from the H$_3$PO$_4$/H$_2$SO$_4$ acidulations in Comparative Example E and Example 8 were analyzed for % P$_2$O$_5$, total carbon and oxidizable carbon. The results were as follows; % P$_2$O$_5$ Example E 27.9%, Example 8 29.9%, ppm total carbon Example E, 1280 Example 8, 370, ppm oxidizable carbon Example E, 650, Example 8 none found.

TABLE 4

| | Hydrochloric Acid acidulation of given rock | | | | | |
|---|---|---|---|---|---|---|
| Heat Treatment Temperature °C. | Example | Morocco Colour of Acid | Morocco Degree of Foaming | Example | Jordan Colour of Acid | Jordan Degree of Foaming |
| Untreated | E | Strong yellow | Much | G | Pale yellow | some |
| 400 | 9 | Strong yellow | medium | 11 | — | — |
| 500 | 10 | Yellow | moderate | 14 | pale yellow with green tinge | small |
| 900 | F | Yellow | negligible | | | |

Similar degrees of foaming occured when the rocks were treated with the phosphoric/sulphuric acid mixture as in Example 4.

TABLE 5

| | | | Results on Florida Rock | | | |
|---|---|---|---|---|---|---|
| | Heat treatment | | HCl Acidulation | | H$_2$SO$_4$/H$_3$PO$_4$ acidulation | |
| Example | Temp. °C. | Time | Colour of Acid | Degree of Foaming | Colour of Acid | Degree of Foaming |
| H | Uncalcined | | Dark-reddish brown. | Large | — | — |
| 13 | 400 | 1 hr. | — | — | Light brown-yellow | small |
| 14 | 500 | 1 hr. | Orange-brown. | medium | Very pale brown-yellow | small |
| 15 | 500 | 2 hrs. | Pale yellow. | small | — | — |
| 16 | 600 | 1 hr. | Yellow-green. | small | — | — |
| J | 900 | 1 hr. | Orange-yellow | none | Very pale green, almost colourless | small |

TABLE 3

Phosphate Rock Analyses

| Source of Rock | Morocco (Khourigba) | Jordan | Florida |
|---|---|---|---|
| % P$_2$O$_5$ | 31.5 | 33.9 | 31.3 |
| % CaO | 51.2 | 52.8 | 45.1 |
| % Na$_2$O | 0.7 | 0.57 | 0.6 |
| % MgO | 0.8 | 0.29 | 0.75 |
| % Al$_2$O$_3$ | 0.40 | 0.28 | 1.8 |
| % Fe$_2$O$_3$ | 0.21 | 0.09 | 2.4 |
| % SiO$_2$ | 2.4 | 2.37 | 5.9 |
| % SO$_3$ | 2.1 | 1.37 | 3.3 |
| % CO$_2$ | 6.4 | 4.46 | 3.6 |
| % F | 4.0 | 3.88 | 3.8 |
| % Cl | 0.03 | 0.06 | 0.005 |
| % organics as C | 0.18 | 0.30 | 1.56 |
| % loss in weight on heating at 105° C. | 1.1 | 1.2 | 0.8 |

Particle Size Analysis % by Weight

| Mesh No. | Morocco | Jordan | Florida |
|---|---|---|---|
| Greater than 1.2 mm (+14 mesh) | 63 | — | — |
| 0.5 mm–1.2 mm (+30 mesh) | 10 | 38 | 35 |
| 0.25–0.5 mm (+60 mesh) | 7 | 24 | 39 |
| 0.15–0.25 mm (+100 mesh) | 15 | 27 | 23 |
| Less than 0.15 mm (−100 mesh) | 5 | 11 | 3 |

EXAMPLE 20–22 AND COMPARATIVE EXAMPLES K–N

Florida rock, of analysis as given above was heated for 1 hour at various temperatures and then the treated rock reacted with the sulphuric/phosphoric acid mixture as in Example 4. A solid comprising calcium sulphate, carbon particles and iron sulphide was separated from the reaction mixture, to leave a product acid. The treated rock was treated with 14% w/w hydrochloric acid and analyzed for soluble iron and sulphide.

The results were as follows.

| Example | Temperature °C | Analysis of Rock sulphide ppm | % Soluble Fe |
|---|---|---|---|
| Comp. Ex. K. | Un heat treated | 70 | 0.57 |
| 20 | 400 | 110 | 0.73 |
| 21 | 500 | 220 | 0.76 |
| 22 | 600 | 980 | 0.94 |
| Comp. Ex. L. | 650 | 2180 | 1.12 |
| Comp. Ex. M | 750 | 3360 | 1.35 |
| Comp. | 900 | 110 | 1.36 |

| | Temperature | Analysis of Rock | |
|---------|-------------|------------------|---------------|
| Example | °C. | sulphide ppm | % Soluble Fe |
| Ex. N. | | | 5 |

I claim:

1. A process for preparing wet process phosphoric acid from phosphate rock containing acid insoluble heat labile iron sulfide and organic compounds wherein phosphate rock is heated to give a heated rock and the heated rock is reacted with a mixture of sulfuric acid and phosphoric acid to form calcium sulfate and phosphoric acid, comprising heating said phosphate rock at a temperature between 380° and 600° C. which is insufficient to convert all said acid insoluble iron sulfide into acid soluble iron sulfide to convert at least some of the organic compounds to carbon to produce a heat treated rock comprising carbon particles and acid insoluble iron sulfide;

reacting said heat treated rock containing carbon particles with said mixture of sulphuric acid and phosphoric acid to form (i) a solid fraction comprising calcium sulfate, carbon particles, and acid insoluble iron sulfide, and (ii) wet process phosphoric acid; and separating said solid fraction to leave purified wet process phosphoric acid.

2. A process according to claim 1 wherein the phosphate rock is heated at 450°–550° C.

3. A process according to claim 1, wherein the phosphate rock before heating is one containing 30–40% $P_2O_5$ and 45–55% CaO.

4. A process according to claim 1, 2 or 3 wherein the phosphate rock before heating is one which gives a brown liquid with 27% hydrochloric acid.

5. A process according to claim 1, 2 or 3 wherein the rock before heating contains a total of 0.05–6% organic compounds (expressed as carbon) and acid soluble organics.

6. A process according to claim 1 or 2 wherein said rock before heating comprises at least 500 ppm acid insoluble iron sulphide (expressed as S).

7. A process according to claim 1 or 2 wherein said phosphate rock comprises 200–40,000 ppm acid insoluble heat labile iron sulfide (expressed as $FeS_2$).

8. A process according to claim 7 wherein said phosphate rock contains at least 1,000 ppm of said acid insoluble heat labile iron sulfide.

9. A process according to claim 1 or 2 wherein said phosphate rock is heated to produce a heated rock containing said carbon particles and iron sulfide, at least 80% of iron sulfide being acid insoluble iron sulfide.

10. A process according to claim 1 or 2 wherein said rock is heated in an atmosphere comprising air.

11. A process according to claim 1 wherein said rock contains (a) between about 0.05% and 6% organic materials expressed by weight as organic carbon, (b) sufficient acid soluble organic compounds so that when said calcium phosphate rock without being heated is reacted with a mixture of sulfuric acid and phosphoric acid, brown wet process phosphoric acid is formed, and (c) at least 500 parts per million of said insoluble heat labile iron sulfide expressed as sulfur; and said rock is heated in an atmosphere containing air at a temperature of between about 450° and 600° C. to form particles of carbon from said acid soluble organic compounds and to produce a heat treated rock containing said carbon particles and iron sulfide, at least 80% of said iron sulfide being acid insoluble iron sulfide.

12. A process according to claim 1 wherein said rock contains (a) between about 0.05% and 6% organic materials expressed by weight as organic carbon, (b) sufficient acid soluble organic compounds so that when said rock without heat treatment is reacted with a mixture of sulfuric acid and phosphoric acid, brown wet process phosphoric acid is formed, and (c) from 200 to 40,000 parts per million of said acid insoluble heat labile iron sulfide expressed as $FeS_2$; and said rock is heated in an atmosphere containing air at a temperature of between about 450° and 600° C. to form particles of carbon from said acid soluble organic compounds and to produce a heat treated rock containing said carbon particles and iron sulfide, at least 80% of said iron sulfide being acid insoluble iron sulfide.

13. A process according to claim 12 wherein said phosphate rock contains at least 1,000 ppm of said acid insoluble heat labile iron sulfide.

14. A process according to claim 1, 11 or 13 wherein said rock is heated continuously in a vessel as part of a continuous heat treatment of said rock and said rock containing carbon particles continuously leaves said vessel.

15. A process according to claim 1, 11 or 13 wherein said rock is passed continuously into a rotating drum and the heated rock is collected therefrom.

16. A process according to claim 1, 11 or 13 wherein the rock is heated continuously in a fluidized bed.

17. A process according to claim 1, 11 or 13 wherein said rock is heated to decompose substantially all the organics and to produce a heat treated rock comprising iron sulfide at least 80% of which is acid insoluble heat labile iron sulfide.

18. A process according to claim 1, 11 or 13 wherein said phosphate rock is heated continuously from 2–30 minutes.

19. A process according to claim 13 wherein the phosphate rock before heating is one containing 30–40% $P_2O_5$ and 45–55% CaO and is heated to decompose substantially all the organics and to produce a heat treated rock comprising heat labile iron sulfide, at least 80% of which is acid insoluble heat labile iron sulfide.

20. A process according to claim 19 wherein the rock is Florida rock.

21. A process according to claim 19 wherein the rock is Idaho rock.

22. A process according to claim 2, 19, 20 or 21 wherein said rock is passed continuously into a rotating drum and heat treated rock is collected therefrom.

23. A process for preparing wet process phosphoric acid from calcium phosphate rock which contains organic compounds and acid insoluble heat labile iron sulfide by reaction with a mixture of sulfuric acid and phosphoric acid, comprising reacting a heat treated calcium phosphate rock which had been prepared by heating said calcium phosphate rock at a temperature of between about 380° C. and 600° C. which is insufficient to convert all of said acid insoluble iron sulfide into acid soluble iron sulfide to convert at least some of said organic compounds to carbon particles and to produce said heat treated rock containing said carbon particles and acid insoluble iron sulfide, with a mixture of sulfuric acid and phosphoric acid to form a reaction mixture containing a solid fraction comprising calcium sulfate, carbon particles and insoluble iron sulfide, and a liquid wet process phosphoric acid fraction; and separating said solid fraction from said liquid wet process phosphoric acid.

24. A process according to claim 23 wherein said heat treated calcium phosphate rock before having been heat treated contains (a) between about 0.05% and 6% organic materials expressed by weight as organic carbons (b) sufficient acid soluble organic compounds so that when said calcium phosphate rock without being heated is reacted with a mixture of sulfuric acid and phosphoric acid, brown wet process phosphoric acid is formed, and (c) at least 500 parts per million of said insoluble heat labile iron sulfide expressed as sulfur; and wherein said calcium phosphate rock was heated in an atmosphere containing air at a temperature of between about 450° and 600° C. to form particles of carbon from said acid soluble organic compounds and to produce a heat treated rock containing said carbon particles and iron sulfide, at least 80% of said iron sulfide being acid insoluble iron sulfide.

25. A process according to claim 23 wherein said heat treated calcium phosphate rock before having been heat treated contains (a) between about 0.05% and 6% organic materials expressed by weight as organic carbon, (b) sufficient acid soluble organic compounds so that when said calcium phosphate rock is reacted with a mixture of sulfuric acid and phosphoric acid, brown wet process phosphoric acid is formed, and (c) from 200 to 40,000 parts per million of said acid insoluble heat labile iron sulfide expressed as $FeS_2$; and wherein said calcium phosphate rock was heated in an atmosphere containing air at a temperature of between about 450° and 600° C. to form particles of carbon from said acid soluble organic compounds and to produce a heat treated rock containing said carbon particles and iron sulfide, at least 80% of said iron sulfide being acid insoluble iron sulfide.

26. A process according to claim 25 wherein said phosphate rock contains at least 1,000 ppm of said acid insoluble heat labile iron sulfide.

* * * * *

UNITED STATES PATENT AND TRADEMARK OFFICE
CERTIFICATE OF CORRECTION

PATENT NO. : 4,325,928

DATED : April 20, 1982

INVENTOR(S) : EDWARD J. LOWE

It is certified that error appears in the above—identified patent and that said Letters Patent is hereby corrected as shown below:

Title page, left column, under the identification of the United Kingdom patent filed March 1, 1979, insert --Feb. 15, 1980  [GB]  United Kingdom.....05170/80--

Column 3, line 12, replace "g" with --e.g.--.

Column 5, line 30, replace "Th" with --The--.

Signed and Sealed this

Twenth-eighth Day of September 1982

[SEAL]

Attest:

GERALD J. MOSSINGHOFF

Attesting Officer

Commissioner of Patents and Trademarks